US010989286B2

(12) United States Patent
Xie et al.

(10) Patent No.: US 10,989,286 B2
(45) Date of Patent: Apr. 27, 2021

(54) MULTIBAND ANTENNA TRANSMISSION DEVICE

(71) Applicant: SHENZHEN ZHAOWEI MACHINERY & ELECTRONICS CO., LTD., Guangdong (CN)

(72) Inventors: Weiqun Xie, Guangdong (CN); Ping Li, Guangdong (CN); Jiemo Li, Guangdong (CN)

(73) Assignee: SHENZHEN ZHAOWEI MACHINERY & ELECTRONICS CO., LTD., Guangdong (CN)

( * ) Notice: Subject to any disclaimer, the term of this patent is extended or adjusted under 35 U.S.C. 154(b) by 123 days.

(21) Appl. No.: 16/323,320

(22) PCT Filed: Mar. 26, 2018

(86) PCT No.: PCT/CN2018/080474
§ 371 (c)(1),
(2) Date: Feb. 5, 2019

(87) PCT Pub. No.: WO2019/109548
PCT Pub. Date: Jun. 13, 2019

(65) Prior Publication Data
US 2020/0173526 A1   Jun. 4, 2020

(30) Foreign Application Priority Data
Dec. 6, 2017   (CN) .......................... 201711276400.5

(51) Int. Cl.
*F16H 1/24*    (2006.01)
*F16H 55/02*    (2006.01)
(Continued)

(52) U.S. Cl.
CPC ............. *F16H 25/24* (2013.01); *F16H 37/12* (2013.01); *H01Q 1/125* (2013.01); *H01Q 3/02* (2013.01); *H01Q 21/30* (2013.01)

(58) Field of Classification Search
CPC .. F16H 2025/2053; F16H 25/24; F16H 37/12; H01Q 1/125; H01Q 3/02; H01Q 21/30
See application file for complete search history.

(56) References Cited

U.S. PATENT DOCUMENTS

| 2008/0134812 A1* | 6/2008 | Murata .................. F16H 25/20 74/25 |
| 2009/0308188 A1* | 12/2009 | Yang ........................ B25J 9/104 74/89.27 |
| 2019/0331220 A1* | 10/2019 | Fu ............................. H01P 1/18 |

FOREIGN PATENT DOCUMENTS

CN   207598840   7/2018

OTHER PUBLICATIONS

Written Opinion and International Search Report of PCT/CN20181080474 dated Aug. 30, 2018, 10 pages (Chinese).

* cited by examiner

*Primary Examiner* — Jake Cook
(74) *Attorney, Agent, or Firm* — Rankin, Hill & Clark LLP

(57) ABSTRACT

A multiband antenna transmission, including: a driving gear, a shifter, and a plurality of screw assemblies. The position and the driving gear are coaxially and rotatably arranged, and the shifter comprises a plate and a boss protruding from a side of the plate. The plurality of screw assemblies are arranged in a circumferential direction of the driving gear. Each of the plurality of screw assemblies includes: a lead screw, a driven gear selectively connected with or separated from the lead screw, and a first elastic member arranged between the lead screw and the driven gear. The boss is (Continued)

configured to sequentially push the driven gear of the respective screw assembly during rotation of the shifter, such that the driven gear is connected with the corresponding lead screw and whereby the driven gear is in mesh with the driving gear for transmission.

12 Claims, 3 Drawing Sheets

(51) Int. Cl.
     *F16H 25/24*      (2006.01)
     *F16H 37/12*      (2006.01)
     *H01Q 1/12*      (2006.01)
     *H01Q 3/02*      (2006.01)
     *H01Q 21/30*      (2006.01)

MULTIBAND ANTENNA TRANSMISSION DEVICE

CROSS-REFERENCE TO RELATED APPLICATIONS

This application is the International Application No. PCT/CN2018/080474 for entry into US national phase with an international filing date of Mar. 26, 2018, designating US, now pending, and claims priority to Chinese Patent Application No. 201711276400.5, filed on Dec. 6, 2017, the contents of which are incorporated herein by reference.

TECHNICAL FIELD

The present application relates to the technical field of transmission device for mobile communication antennas, and more particularly to a multiband antenna transmission device.

BACKGROUND

With the development of mobile communication technology, large-capacity multi-band antennas have become an important development trend of mobile communication antennas. To accommodate more antennas within a limited space, it is not possible to simply assemble multiband antennas together, which would otherwise make the whole antenna bulky, heavy, and inefficient.

A large-capacity multiband antenna of an existing product, in which a plurality of frequency bands are collectively assembled in a single antenna, a regulator for the respective frequency band is connected with a rack, and a plurality of racks are arranged side by side on a plane and driven by a common driving gear to move, thereby realizing the regulation. Regulation of the different racks is achieved when the common gear meshes with different racks at different positions. Since the common gear has to be moved to different racks positions, strict requirements are imposed on the positions of the common gear and the racks, and the common gear of the existing product is prone to be jammed when moving, which affects the timeliness and accuracy of the regulation of the antenna.

Technical Problem

It is an object of the present application to provide a multiband antenna transmission device, so as to solve the technical problem that the existing multiband antenna adopts the gear and racks to regulate positions, which imposes strict requirements on the positions of the gear and the racks and would result in jamming of the common gear during the moving thereof.

Technical Solutions

In order to achieve the above object, the technical solution adopted by the present application is to provide a multiband antenna transmission device, including:
a driving gear;
a shifter, where the shifter and the driving gear are coaxially and rotatably arranged, and the shifter comprises a plate and a boss protruding from a side of the plate; and
a plurality of screw assemblies, arranged in a circumferential direction of the driving gear, with each of the plurality of screw assemblies including: a lead screw, a driven gear selectively connected with or separated from the lead screw, and a first elastic member arranged between the lead screw and the driven gear. The boss is configured to sequentially push the driven gear of the respective screw assembly during rotation of the shifter, such that the driven gear is connected with the corresponding lead screw and whereby the driven gear is in mesh with the driving gear for transmission.

BENEFICIAL EFFECTS

By rotating the shifter, the boss of shifter pushes one of the driven gears such that the driven gear is connected with the corresponding lead screw, and whereby the driven gear is in mesh with the driving gear for transmission, thereby driving the lead screw to rotate, and in such condition, the first elastic member is in a compressed state, in which the first elastic member can reliably transmit the power of the driven gear to the lead screw. By rotating the shifter, the boss of shifter does not push the above-mentioned driven gear, and the first elastic member is elongated, such that the driven gear is reset and separated from the driving gear, and the power transmission is cut off. The multiband antenna transmission adopts a circumferential layout, which saves a lot of space and minimizes the overall volume. The screw assembly to be regulated is determined by the shifter to achieve one driving power completing the regulation of a plurality of screw assemblies, that is, one drags multiple, and the other power source is the regulation power configured to regulate the shifter. The connected driven gear and lead screw and the compressed first elastic member are jointly driven and rotated, so that the regulation action is smoother and the jamming phenomenon is avoided.

BRIEF DESCRIPTION OF THE DRAWINGS

In order to illustrate the technical solutions in the embodiments of the present application more clearly, the drawings used in the embodiments or the description of the prior art will be briefly described below, it is obvious that the drawings in the following description are only some embodiments of the present application, other drawings may be obtained by ordinary persons skilled in the art without any creative work.

DETAILED DESCRIPTION OF THE DRAWINGS

Figure 1:
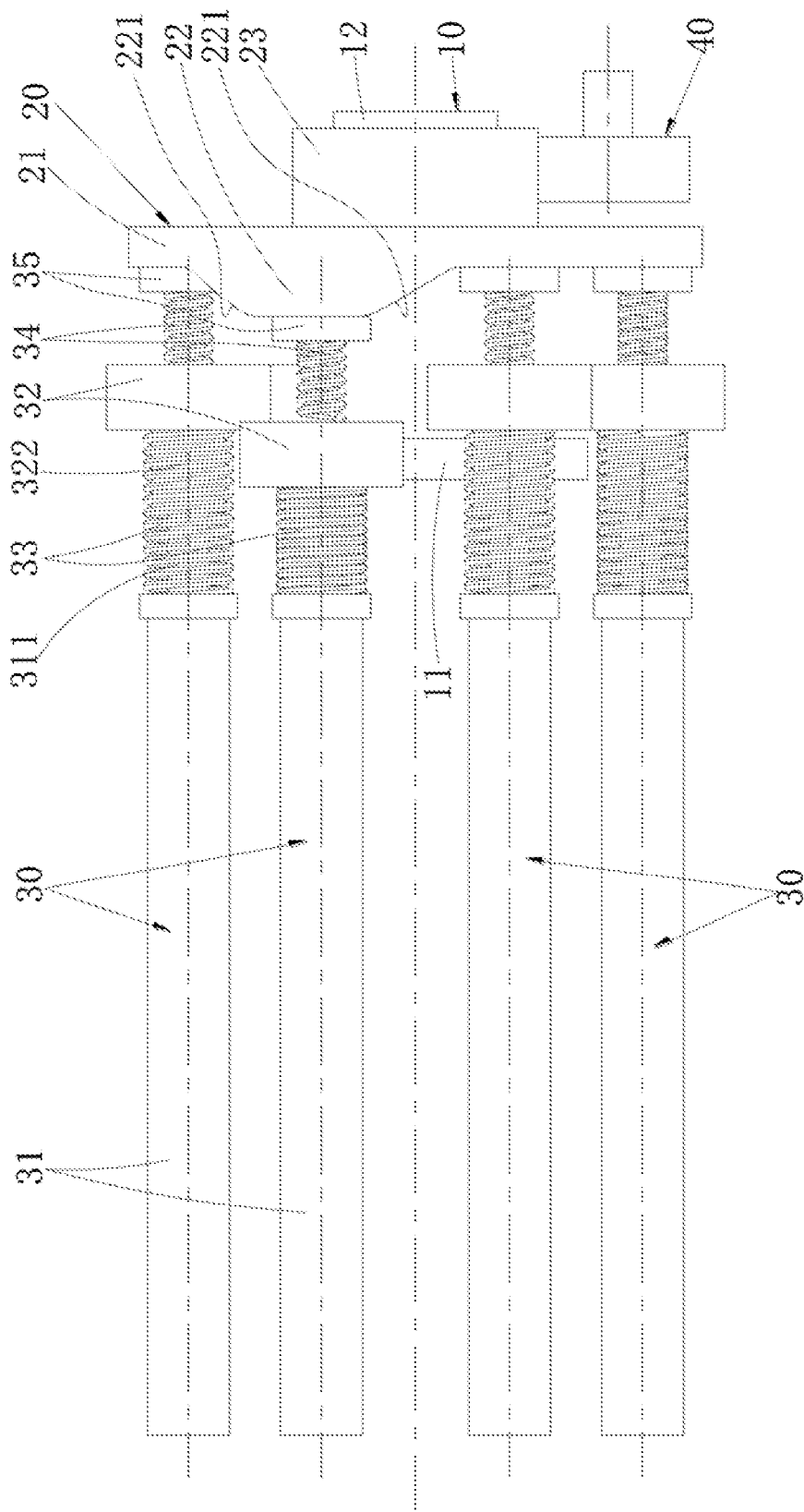
FIG. 1 is a front view of the multiband antenna transmission device provided by some embodiments of the present application.

In order to make the technical problems to be solved, technical solutions, and beneficial effects of the present application more clear, the present application will be further described in detail hereinbelow with reference to the accompanying drawings and embodiments. It should be understood that the specific embodiments described herein are merely intended to explain the application rather than to limit the present application.

It should be noted that when an element is referred to as being "fixed" or "arranged" at/in/on another element, it can be directly at/in/on the other element. When an element is referred to as being "connected" to/with the another element, it can be directly or indirectly connected to/with the other element.

It should be understood that the orientation or positional relationship indicated by terms "length", "width", "upper", "lower", "front", "back", "left", "right", "vertical", "horizontal", "top", bottom", "inside", "outside", or the like is based on the orientation or positional relationship shown in the drawings, and is merely for facilitating and simplifying the description of the present application, and does not indicate or imply that the device or component referred to must have a particular orientation or be constructed and operated in a particular orientation, and thus are not to be construed as defining the present application.

Moreover, the terms "first" and "second" are adopted for descriptive purposes only and are not to be construed as indicating or implying a relative importance or implicitly indicating the number of technical features indicated. Thus, features defining "first" and "second" may include one or more of the features either explicitly or implicitly. In the description of the present application, the meaning of "a plurality of" or "multiple" is two or more unless otherwise particularly defined.

Figure 2:
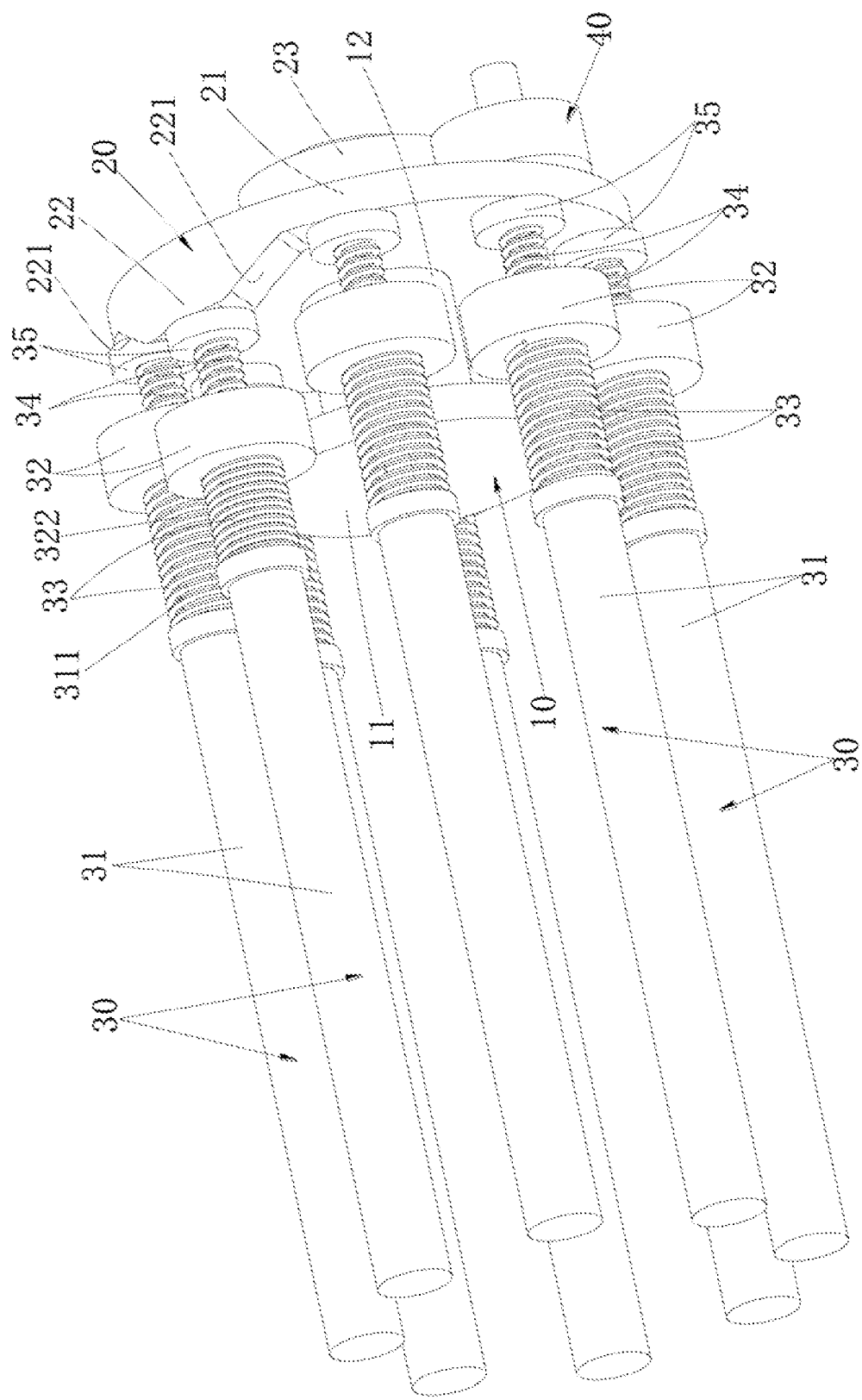
FIG. 2 is a perspective assembled view of the multiband antenna transmission device of FIG. 1.
Figure 3:
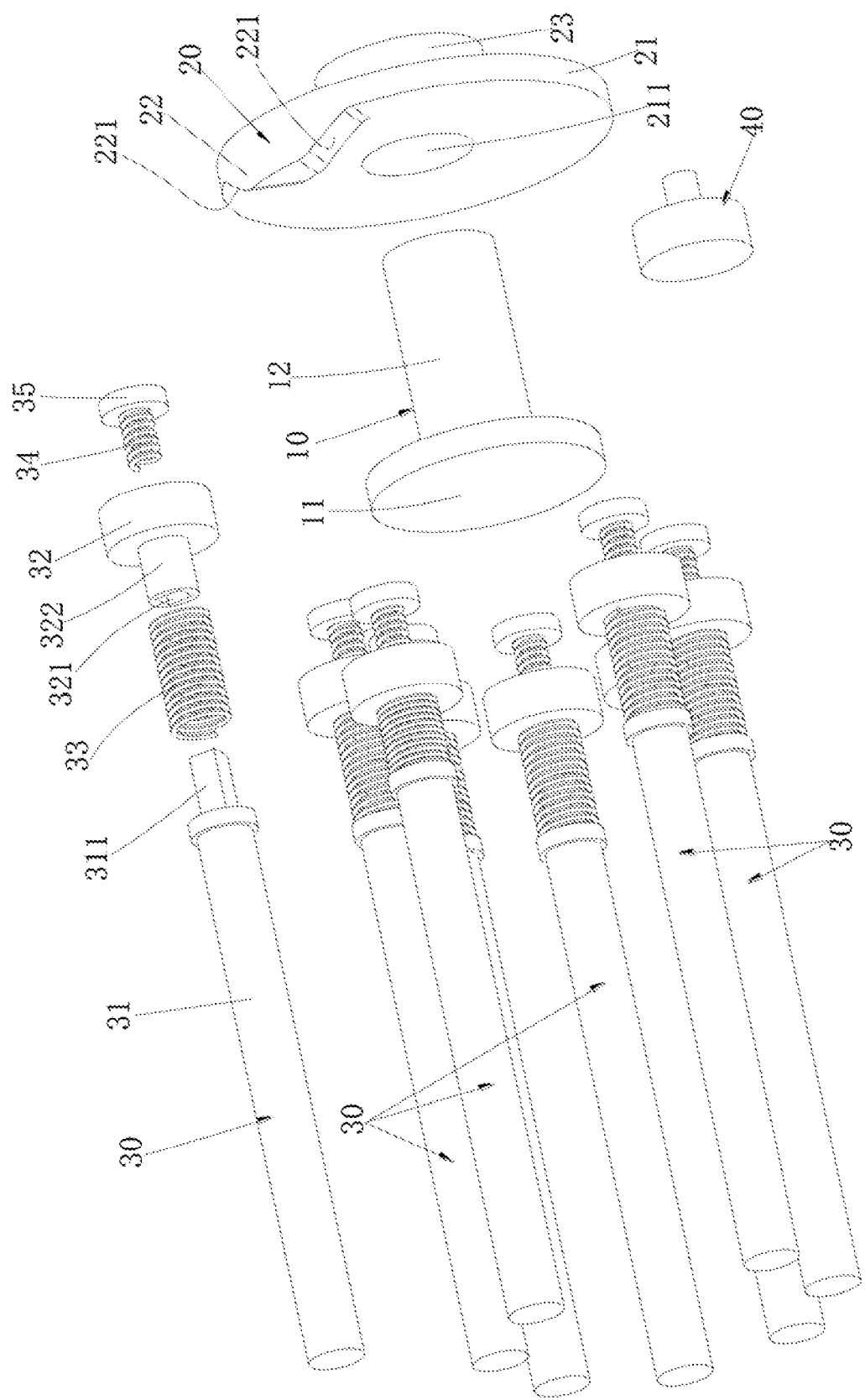
FIG. 3 is an exploded perspective view of the multiband antenna transmission device of FIG. 2.

Referring to FIGS. 1-3, the multiband antenna transmission device provided by the present application is described herein. The multiband antenna transmission includes: a driving gear 10, a shifter 20, and a plurality of screw assemblies 30. The shifter 20 and the driving gear 10 are coaxially and rotatably arranged, and the shifter 20 includes a plate 21 and a boss 22 protruding from a side of the plate 21. The plurality of screw assemblies 30 are arranged in a circumferential direction of the driving gear 10. Each of the plurality of screw assemblies 30 includes: a lead screw 31, a driven gear 32 selectively connected with or separated from the lead screw 31, and a first elastic member 33 arranged between the lead screw 31 and the driven gear 32. The boss 22 is configured to sequentially push the driven gear 32 of one of the plurality of screw assemblies 30 during rotation of the shifter 20, such that the driven gear 32 of the one of the plurality of screw assemblies is connected with the corresponding lead screw 31 and the driven gear 32 of the one of the plurality of screw assemblies meshes with the driving gear 10 for transmission.

By rotating the shifter 20, the boss 22 of shifter 20 pushes one of the driven gears 32 such that the driven gear 32 is connected with the corresponding lead screw 31, and the driven gear 32 meshes with the driving gear 10 for transmission, thereby driving the lead screw 31 to rotate, and in such condition, the first elastic member 33 is in a compressed state, in which the first elastic member 33 can reliably transmit the power of the driven gear 32 to the lead screw 31. By rotating the shifter 20, the boss 22 of shifter 20 does not push the above-mentioned driven gear 32, and the first elastic member 33 is elongated, such that the driven gear 32 is reset and separated from the driving gear 10, and the power transmission is cut off. The multiband antenna transmission adopts a circumferential layout, which saves a lot of space and minimizes the overall volume. The screw assembly 30 to be regulated is determined by the shifter 20 to achieve one driving power completing the regulation of a plurality of screw assemblies 30, that is, one drags multiple, and the other power source is the regulation power configured to regulate the shifter 20. The connected driven gear 32 and lead screw 31 and the compressed first elastic member 33 are jointly driven and rotated, so that the regulation action is smoother and the jamming phenomenon is avoided.

The driving gear 10 is rotatable about its own axis, but is unable to move forward or backward.

The shifter 20 is sleeved outside the driving gear 10 and coaxial with the driving gear 10, the shifter 20 is able to rotate about its own axis, but does not rotate along with the rotation of the driving gear 10, and the shifter 20 cannot move forward or backward. A smooth guiding surface 221 is provided between each of two ends of the boss 22 and the plate 21, thereby guiding an end face of the respective lead screw assembly 30 to move to a highest position of the boss 22.

The plurality of screw assemblies 30 are uniformly and circumferentially distributed around an axis of the driving gear 10. Under the action of the first elastic member 33, the end face of the corresponding screw assembly 30 is in contact with the shifter 20, and is able to be in contact with the plate 21 or the boss 22. A distance between the axis of boss 22 and an axis of the shifter 20 is equal to a distance between an axis of respective screw assembly 30 and the axis of shifter 20. The shifter 20 is rotated to rotate the boss 22 to different positions and is capable of pushing the respective driven gears 32 in the axial direction of the driven gear 32.

The front and rear positions of the driven gear 32 are not fixed, the driven gears 32 are slidably mounted on a frame, and are also rotatable about their own axes. One end of the first elastic member 33 is in contact with the driven gear 32, and the other end is in contact with the end face of the lead screw 31. The lead screw 31 and the driven gear 32 are on the same axis, and the lead screw 31 is unable to move forward or backward but is able to rotate about its own axis.

In a normal state, the end face of the respective screw assembly 30 is in contact with the plate 21, and the tooth face of the driven gear 32 is not in contact with the tooth face of the driving gear 10, in such condition, the rotation of the driving gear 10 does not affect the position of the driven gear 32 or the position of the lead screw 31. In such condition, the first elastic member 33 is not significantly compressed either, and the driven gear 32 and the corresponding lead screw 31 are also separated from each other.

When regulation is required, by rotating the shifter 20, the boss 22 on the shifter 20 is rotated to a back of a certain screw assembly 30, and the boss 22 pushes the corresponding driven gear 32 to move to a position where the corresponding driven gear 32 contacts with the tooth face of the drive gear 10, and the driven gear 32 and an end of the lead screw 31 are in a connected state. In such condition, the rotation of the driving gear 10 will drive the driven gear 32 to rotate, the power of the driving gear 10 is transmitted to the lead screw 31 by the connection between the driven gear 32 and the lead screw 31 and by the first elastic member 33, the rotation of lead screw 31 drives the corresponding regulator to work.

The lead screw 31 and the driven gear 32 are coaxially arranged, and the end of the lead screw 31 and the driven gear 32 are selectively connected with or separated from each other in the axial direction. In case that the lead screw 31 and the driven gear 32 are not timely connected, since the first elastic member 33 is compressed in such condition, the rotation of the driven gear 32 is transmitted to the lead screw 31 through the first elastic member 33. The first elastic member 33 ensures timely transmission of rotation when the lead screw 31 and the driven gear 32 are not reliably connected.

The driving gear 10, the shifter 20, and the screw assembly 30 are all mounted on the frame (not shown in figures).

Further, as a specific embodiment of the multiband antenna transmission device provided by the present application, the respective screw assembly 30 further includes a second elastic member 34 arranged for the corresponding driven gear 32, and a distal end of the second elastic member 34 away from the driven gear 32 faces the shifter 20, and when the shifter 20 rotates, the boss 22 sequentially abuts against the distal end of the second elastic member 34 of one of the plurality of screw assemblies 30 to push the corresponding driven gear 32, thereby enabling the corresponding driven gear 32 to be connected with the lead screw 31 and to mesh with the driving gear 10 for transmission. One end of the second elastic member 34 is in contact with the end face of the driven gear 32, and the other end is in contact with the shifter 20, and the second elastic member 34 is compressible along its axis. The boss 22 is rotated to different positions by rotating the shifter 20 and is therefore capable of contacting with different second elastic members 34. The second elastic member 34 is configured to enable the boss 22 to reliably push one of the driven gears 32 to move via the corresponding second elastic member 34.

In the normal state, the end face of the respective screw assembly 30 is in contact with the plate 21, the second elastic member 34 is not significantly compressed, and the tooth face of the driven gear 32 is not in contact with the tooth face of the driving gear 10, in such condition, the rotation of the driving gear 10 does not affect the position of the driven gear 32 or the position of the lead screw 31. In such condition, the first elastic member 33 is not significantly compressed either, and the driven gear 32 and the corresponding lead screw 31 are also separated from each other.

When regulation is required, by rotating the shifter 20, the boss 22 on the shifter 20 is rotated to a back of a certain screw assembly 30, the boss 22 pushes the corresponding second elastic member 34, which makes the second elastic member 34 compressed and further push the corresponding driven gear 32 to move to a position where the corresponding driven gear 32 contacts with the tooth face of the drive gear 10, and the driven gear 32 and an end of the lead screw 31 are in a connected state. In such condition, the rotation of the driving gear 10 will drive the driven gear 32 to rotate, the power of the driving gear 10 is transmitted to the lead screw 31 by the connection between the driven gear 32 and the lead screw 31 and by the first elastic member 33, the rotation of lead screw 31 drives the corresponding regulator to work.

Further, as a specific embodiment of the multiband antenna transmission device provided by the present application, the distal end of each second elastic member 34 away from the corresponding driven gear 32 is connected with an abutting block 35. The abutting block 35 can reliably abut against the plate 21 or the boss 22 of the shifter 20, which makes the operation reliable.

Further, as a specific embodiment of the multiband antenna transmission device provided by the present application, in each of the plurality of screw assemblies 30, the lead screw 31 and the driven gear 32 are selectively connected with or separated from each other by a coupler. The end of the lead screw 31 close to the driven gear 32 is connected with the driven gear 32 via the coupler which can be in various forms, and the coupler is capable of transmitting the rotation of the driven gear 32 to the lead screw 31. The first elastic member 33 ensures timely transmission of the rotation when the coupler is not reliably connected. The coupler and the compressed first elastic member 33 are jointly driven and rotated to make the regulation action smoother and avoid the jamming phenomenon.

Further, as a specific embodiment of the multiband antenna transmission device provided by the present application, in each of the plurality of screw assemblies 30, one side of the driven gear 32 is provided with a shaped hole 321, and one end of the lead screw 31 is provided with an insertion shaft 311 configured to be inserted and fitted into the shaped hole 321. The shaped hole 321 may be a regular polygonal hole or a D-shaped hole or other type of holes, and accordingly, the insertion shaft 311 is an insertion shaft with fitted shape. Or alternatively, in each of the plurality of screw assemblies 30, one side of the driven gear 32 is provided with a spline slot, and one end of the lead screw 31 is provided with a spline shaft configured to be inserted and fitted into the spline slot. Specific embodiment can be selected as needed. The connection state is achieved when the shaft is inserted into the hole or the groove, and the separation state is achieved when the shaft is separated from the hole or the groove.

Further, as a specific embodiment of the multiband antenna transmission device provided by the present application, in each of the plurality of screw assemblies 30, two ends of the first elastic member 33 abut against one end of the lead screw 31 and a side face of the driven gear 32 respectively. The structure is easy to be processed and assembled, and the first elastic member 33 is reliably disposed between the lead screw 31 and the driven gear 32. The lead screw 31 and the driven gear 32 are selectively connected with or separated from each other. When the first elastic member 33 is compressed, the rotation of the driven gear 32 can be transmitted to the lead screw 31 through the first elastic member 33, thereby avoiding the untimely connection between the lead screw 31 and the driven gear 32.

Further, as a specific embodiment of the multiband antenna transmission device provided by the present application, in each of the plurality of screw assemblies 30, a side of the driven gear 32 facing toward the lead screw 31 extends to form a limit segment 322, and the first elastic member 33 is sleeved outside the limit segment 322. The structure facilitates the assembly of the first elastic member 33.

Further, as a specific embodiment of the multiband antenna transmission device provided by the present application, the driving gear 10 includes a gear portion 11 and a connection shaft 12 connected with the gear portion 11, the plate 21 defines therein a through hole 211, and the connection shaft 12 passes through the through hole 211. Such technical solution makes the structure be easily assembled and compact.

Further, as a specific embodiment of the multiband antenna transmission device provided by the present application, the shifter 20 further includes an external gear 23 connected with a side of the plate 21 away from the boss 22, and the connection shaft 12 sequentially passes through the through hole 211 and an inner hole of the external gear 23, and the external gear 23 meshes with an input gear 40. The rotation of the input gear 40 drives the external gear 23 to rotate, so that the boss 22 of the shifter 20 rotates, and the rotation of the shifter 20 does not drive the driving gear 10 to rotate. The input gear 40 is rotatable about itself, and it cannot be moved forward or backward. The input gear 40 is mounted to the frame.

Further, as a specific embodiment of the multiband antenna transmission device provided by the present application, the axis of the driving gear 10 and the axis of the lead screw 31 of each of the plurality of screw assemblies 30 are parallel to each other. The solution results in easy assemblage and a compact structure. The circumferential layout saves a lot of space and minimizes the overall volume.

The above-said is only the preferred embodiment of the present application, and it is not intended to limit the present application, any modifications, equivalents and improvements made within the spirit and principles of the present application should be included within the protection scope of the present application.

What is claimed is:

1. A multiband antenna transmission, comprising:
a driving gear;
a shifter, wherein the shifter and the driving gear are coaxially and rotatably arranged, and the shifter comprises a plate and a boss protruding from a side of the plate; and
a plurality of screw assemblies, arranged in a circumferential direction of the driving gear, with each of the plurality of screw assemblies comprising: a lead screw, a driven gear selectively connected with or separated from the lead screw, and a first elastic member arranged between the lead screw and the driven gear;
wherein
the boss is configured to sequentially push the driven gear of one of the plurality of screw assemblies during rotation of the shifter, such that the driven gear of one of the plurality of screw assemblies is connected with the corresponding lead screw and whereby the driven gear of one of the plurality of screw assemblies is in mesh with the driving gear for transmission.

2. The multiband antenna transmission of claim 1, wherein each of the plurality of screw assemblies further comprises a second elastic member arranged for the corresponding driven gear, a distal end of the second elastic member away from the driven gear faces the shifter, and when the shifter rotates, the boss sequentially abuts against the distal end of the second elastic member of one of the plurality of screw assemblies to push the corresponding driven gear.

3. The multiband antenna transmission device of claim 2, wherein in each of the plurality of screw assemblies, the distal end of the second elastic member away from the corresponding driven gear is connected with an abutting block.

4. The multiband antenna transmission device of claim 1, wherein in each of the plurality of screw assemblies, the lead screw and the driven gear are selectively connected with or separated from each other via a coupler.

5. The multiband antenna transmission device of claim 4, wherein in each of the plurality of screw assemblies, one side of the driven gear is provided with a shaped hole, and one end of the lead screw is provided with an insertion shaft configured to be inserted and fitted into the shaped hole; or alternatively, in each of the plurality of screw assemblies, one side of the driven gear is provided with a spline slot, and one end of the lead screw is provided with a spline shaft configured to be inserted and fitted into the spline slot.

6. The multiband antenna transmission device according to claim 1, wherein in each of the plurality of screw assemblies, two ends of the first elastic member abut against one end of the lead screw and a side of the driven gear, respectively.

7. The multiband antenna transmission device of claim 6, wherein in each of the plurality of screw assemblies, a side of the driven gear facing toward the lead screw extends to form a limit segment, and the first elastic member is sleeved outside the limit segment.

8. The multiband antenna transmission device according to claim 1, wherein the driving gear comprises a gear portion and a connection shaft connected with the gear portion, the plate defines therein a through hole, and the connection shaft passes through the through hole.

9. The multiband antenna transmission device of claim 8, wherein the shifter further comprises an external gear connected with a side of the plate away from the boss, and the connection shaft sequentially passes through the through hole and an inner hole of the external gear, and the external gear meshes with an input gear.

10. The multiband antenna transmission according to claim 1, wherein an axis of the driving gear and an axis of the lead screw of each of the plurality of screw assemblies are parallel to each other.

11. The multiband antenna transmission device according to claim 1, wherein a smooth guiding surface is provided between each of two ends of the boss and the plate.

12. The multiband antenna transmission device according to claim 1, wherein in each of the plurality of screw assemblies, the lead screw and the driven gear are coaxially arranged.

* * * * *